United States Patent
Lappe et al.

(10) Patent No.: US 11,755,182 B2
(45) Date of Patent: Sep. 12, 2023

(54) ELECTRONIC DEVICES AND METHODS FOR SELECTING AND DISPLAYING AUDIO CONTENT FOR REAL ESTATE PROPERTIES

(71) Applicant: Direct Offer, Inc., Nashville, TN (US)

(72) Inventors: Kathleen Lappe, Nashville, TN (US); Jonathan Burton, Gallatin, TN (US)

( * ) Notice: Subject to any disclaimer, the term of this patent is extended or adjusted under 35 U.S.C. 154(b) by 0 days.

(21) Appl. No.: 17/947,105

(22) Filed: Sep. 17, 2022

(65) Prior Publication Data
US 2023/0014719 A1   Jan. 19, 2023

Related U.S. Application Data

(63) Continuation of application No. 16/939,762, filed on Jul. 27, 2020, now Pat. No. 11,474,672.

(51) Int. Cl.
*G06F 3/0484* (2022.01)
*G06Q 50/16* (2012.01)

(52) U.S. Cl.
CPC ......... *G06F 3/0484* (2013.01); *G06Q 50/163* (2013.01); *G06Q 50/16* (2013.01)

(58) Field of Classification Search
CPC ....... G06F 3/0484; G06F 16/16; G06Q 50/16; G06Q 50/163; G06Q 50/165; G06Q 50/167
See application file for complete search history.

(56) References Cited

U.S. PATENT DOCUMENTS

| | | | |
|---|---|---|---|
| 8,175,794 B1 * | 5/2012 | Szybalski | G06F 16/29 701/454 |
| 10,430,902 B1 * | 10/2019 | Rawat | G06F 16/215 |
| 2012/0089597 A1 * | 4/2012 | Visioli | G06Q 50/16 707/E17.014 |
| 2014/0297479 A1 * | 10/2014 | McCloskey | G06Q 30/0627 705/26.63 |
| 2018/0253780 A1 * | 9/2018 | Wang | H04L 51/02 |
| 2020/0257746 A1 * | 8/2020 | Gibbon | G06F 16/9535 |

* cited by examiner

*Primary Examiner* — Daniel Samwel
(74) *Attorney, Agent, or Firm* — Thrasher Associates

(57) ABSTRACT

Disclosed is a method implemented in software for providing digital audio content to a first user of an electronic device. The method includes displaying digital audio content to a first user, determining a digital audio content to be provided to the first user based on a demographic information, a psychographic information or a preference of the first user. The method may include receiving an input from the first user on a graphical user interface element that is displayed along with multimedia content, and may include triggering playback of the digital audio content in response to the first user performing actions on the graphical user interface element. The method has particular advantages as a method of providing a customized user-experience for a prospective or possible real estate transaction.

11 Claims, 6 Drawing Sheets

FIG. 4 - User-interface that shows a multimodal recording screen for the second user

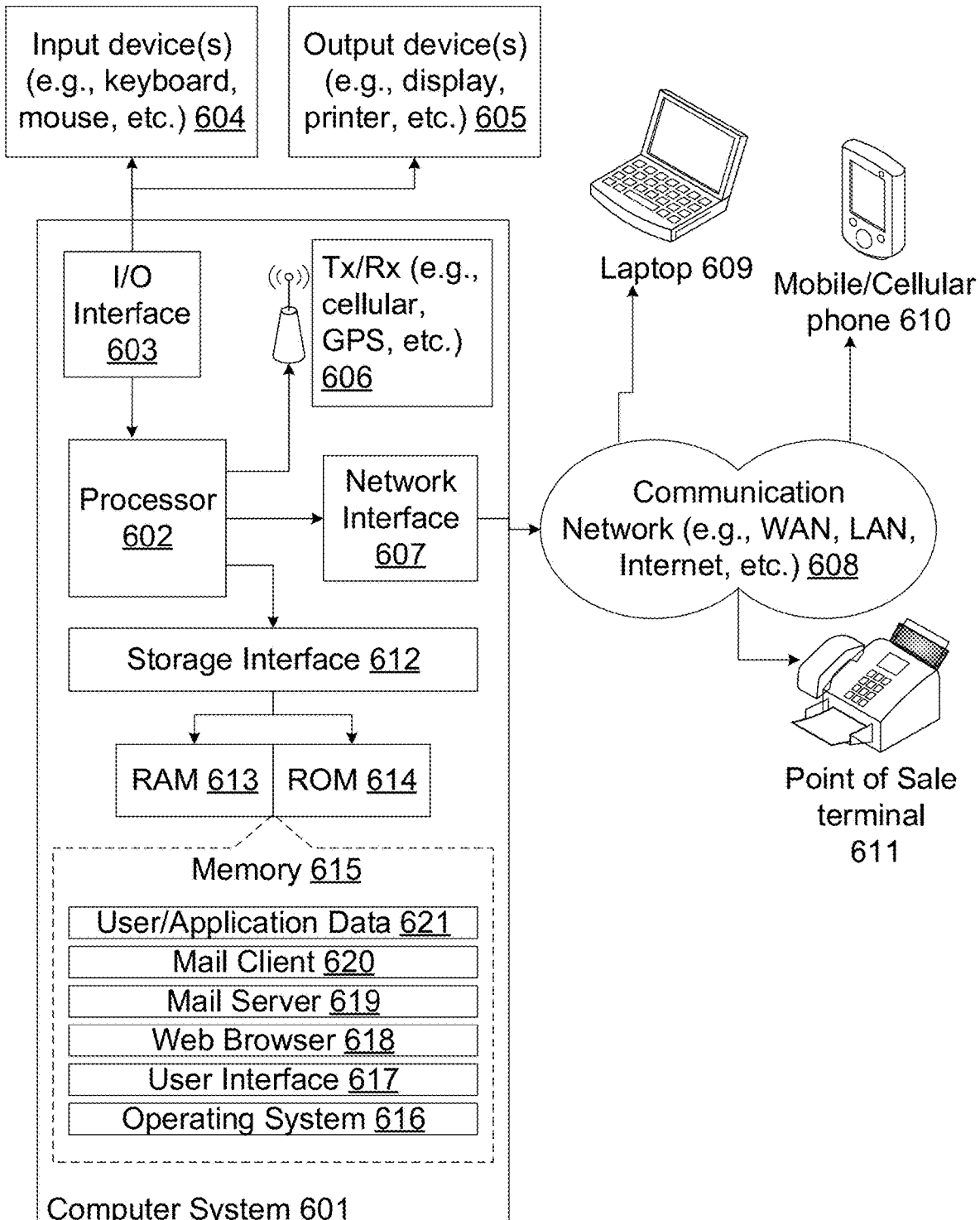
FIG. 6 Example Computer System

ELECTRONIC DEVICES AND METHODS FOR SELECTING AND DISPLAYING AUDIO CONTENT FOR REAL ESTATE PROPERTIES

CLAIM OF PRIORITY, IDENTIFICATION OF RELATED APPLICATIONS

This Non-Provisional patent application claims priority from U.S. Non-Provisional patent application Ser. No. 16/939,762 filed on 27 Jul. 2020 entitled "Electronic devices and methods for selecting and displaying multimodal content" to common inventor Kathleen A. Lappe.

TECHNICAL FIELD

The invention is related to devices and methods that facilitate the creation and displaying of near-custom-targeted digital content in a presentation context.

BACKGROUND

Conventional digital cameras, cell phones/smart phones and other image capturing devices that are capable of recording sound are now ubiquitous. These devices allow a user to capture an image to produce an image file and to record audio content that can be attached to the image file. Information (called "metadata") such as the recording date, the recording location, the photographer's name, a description of the event, and other information can be recorded, stored and associated with an audio, visual or video file. However, there are limitations with these devices. For example, with existing devices, only one audio file can be attached per image. This means that if one desires to append an audio recording to an existing audio file, the conventional digital camera will erase the existing audio file and replace it with the appended audio information.

Thus, current technology does not provide any means for a user to view additional multimodal content (audio, visual, or video) that is associated with a first multimedia content type.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments provided herein, there are devices and methods implemented in software for providing content to a first user. The method may include displaying digital content to a first user, determining multimodal content to be provided to the first user based on at least one aspect of the first user, such as a psychographic preference of the first user (eg a real estate preference) or a demographic preference, for example. The method may also include receiving an input from the first user on a graphical user interface element that is displayed along with the digital content, and triggering playback of the determined multimodal content in response to the user performing one or more input actions, such as touching a graphical user interface element (such as hovering, clicking, and double clicking).

The invention may be embodied as a system that includes an electronic device having one or more possessors configured to provide multimodal content to a first user, and configured to determine multimodal content to be provided to the first user based on at least one aspect of the first user, such as demographic or phychographic information, or a preference of the first user associated with a real estate. The device may also, via software running on at least one processor, trigger playback of the determined multimodal content.

BRIEF DESCRIPTION OF DRAWINGS

The accompanying drawings illustrate the various embodiments of systems, methods, and other aspects of the disclosure. A person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the drawings, which are provided to illustrate and not to limit the scope in any manner, wherein similar designations denote similar elements, and in which:

FIG. 4 illustrates a user interface displayed to a second user for multimodal content recording;

FIG. 6 is a block diagram of a computer system according to the invention.

DETAILED DESCRIPTION

The present disclosure may be best understood with reference to the detailed figures and description set forth herein. Those skilled in the art will readily appreciate that the detailed descriptions given herein with respect to the figures are for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
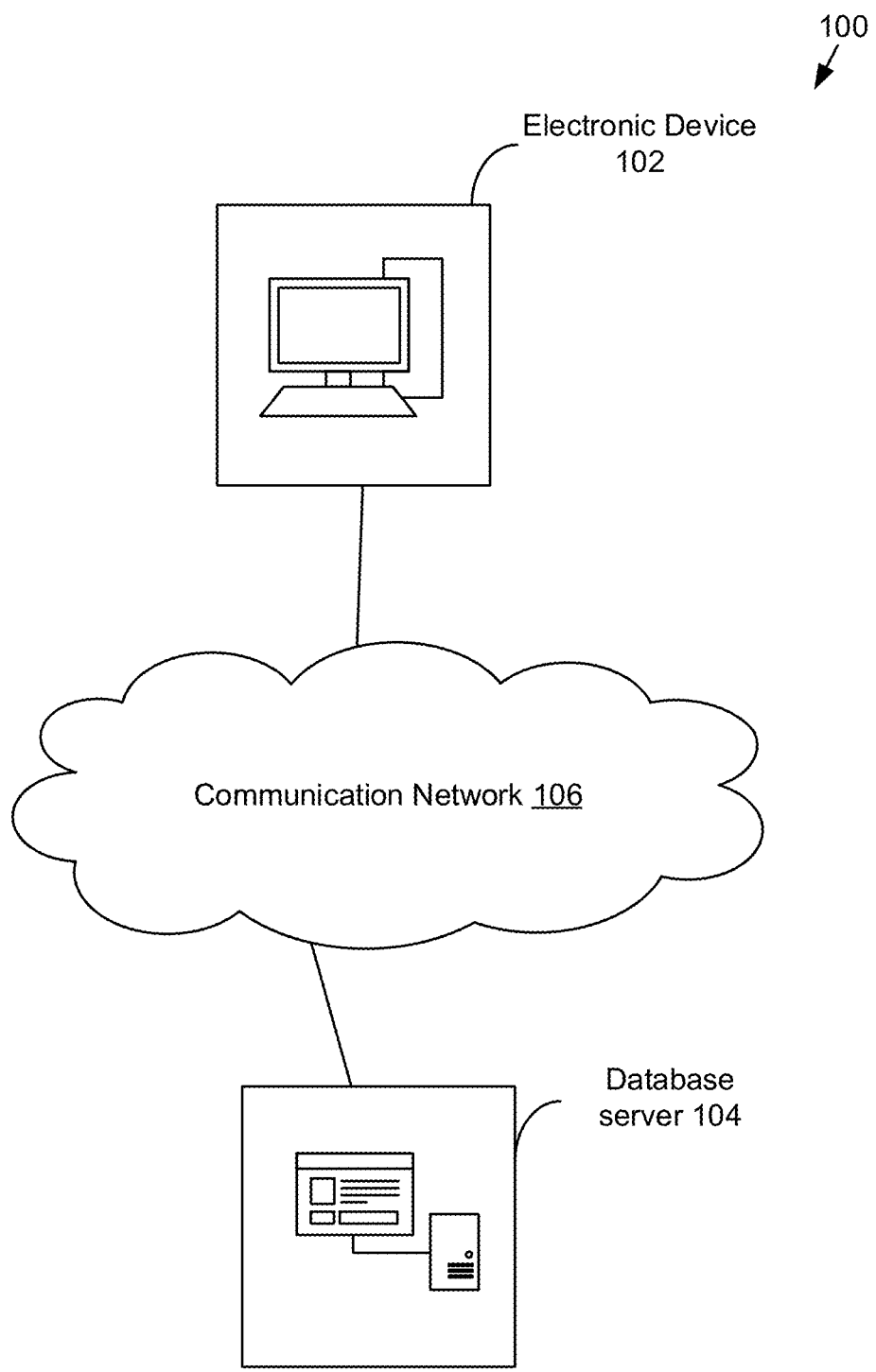
FIG. 1 is a block diagram that illustrates a system environment in which various embodiments of the method and the system may be implemented.

FIG. 1 is a block diagram that shows an exemplary system environment 100. The system environment 100 typically includes an electronic device 102, a database server 104, and a communication network 106. The electronic device 102 and the database server 104 are typically communicatively coupled with each other via the communication network 106. In an embodiment, the electronic device 102 may communicate with the database server 104 using one or more protocols such as, but not limited to, Open Database Connectivity (ODBC) protocol and Java Database Connectivity (JDBC) protocol.

The electronic device 102 may refer to a computing device used by the first user. In an embodiment, the first user may be a user who is interested to view digital multimedia content, such as images and/or videos of real estates. The electronic device 102 may comprise of one or more processors and one or more memory units (aka "memories"). The one or more memories may include computer readable code that may be executable by the one or more processors to perform predetermined operations. In an embodiment, the electronic device 102 presents a user-interface to the first user for providing digital content to a first user. Examples of the electronic devices generally, and electronic device 102 may include, but are not limited to, a personal computer, a laptop, a personal digital assistant (PDA), a mobile device which may include a tablet, smart phone or smart watch such as an Apple Watch® or any other computing device.

The electronic device 102 is preferably configured to provide digital multimodal content (aka "digital content") to a first user, where the digital content may originate from a plurality of users. The electronic device 102 may be configured to determine multimodal content to be provided to the first user based on at least one of demographic or psychographic information of the first user, such as a real estate preference. The electronic device 102 may be configured to receive an input from the first user on a graphical user interface element that is displayed along with the digital multimedia content. Preferably, the input corresponds to performing one or more actions by the first user on the graphical user interface element. The electronic device 102 may be configured to trigger playback of the determined digital multimodal content in response to the user performing one or more actions on the graphical user interface element, such as hovering, clicking, double clicking, and the like.

The database server 104 may refer to a computing device that is configured to store demographic and psychographic information and preferences of each of the plurality of users, including real estate preferences. The database server 104 includes a special purpose operating system specifically configured to perform one or more database operations on the multimedia content. Examples of database operations may include, but are not limited to, Select, Insert, Update, Push, Pull, and Delete. Preferably, the database server 104 includes hardware that may be configured to perform one or more predetermined operations. The database server 104, and database servers generally, may be realized through various technologies such as, but not limited to, Microsoft® SQL Server or Access® or Azure®, Oracle®, IBM DB2®, PostgreSQL®, MySQL® and SQLite®, and the like.

The database server 104 may be configured to transmit the demographic and/or psychographic information of each user and preferences of each user to the electronic device 102 for data processing, via the communication network 106. Additionally, the database server 104 may be configured to store recorded digital multimodal content for the plurality of users, and may be configured to store the digital multimedia content. And, the stored content may be transmitted to the electronic device 102 for displaying to a first user. Further, such stored digital multimedia content may be provided to a second user, such as a real estate agent or marketer, who may record digital content.

A person with ordinary skills in the art will understand that the scope of the disclosure is not limited to the database server 104 as a separate entity. In an embodiment, the functionalities of the database server 104 can be integrated into the electronic device 102.

The communication network 106 may correspond to a communication medium through which the electronic device 102 and the database server 104 may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, 6G cellular communication protocols, and/or Bluetooth (BT) communication protocols, for example. Additionally, the communication network 106 may include, without limitation, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
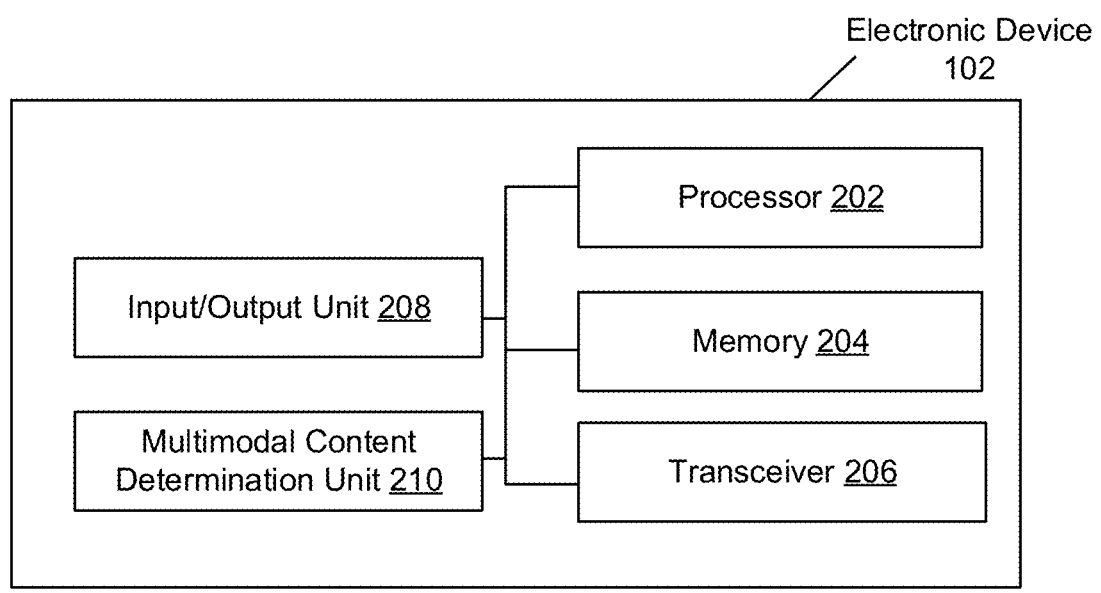
FIG. 2 is a block diagram that illustrates an electronic device configured for providing multimodal content to a first user.

FIG. 2 is a block diagram that illustrates an electronic device 102 configured for providing multimodal content to a first user, and is explained in conjunction with elements from FIG. 1. Here, the electronic device 102 includes a processor 202, a memory 204, a transceiver 206, an input/output unit 208, and a multimodal content determination unit 210. The processor 202 is further preferably communicatively coupled to the memory 204, the transceiver 206, the input/output unit 208, and the multimodal content determination unit 210, while the transceiver 206 is preferably communicatively coupled to the communication network 106.

The processor 202 comprises suitable logic, circuitry, interfaces, and/or code that may be configured to execute a set of instructions stored in the memory 204, and may be implemented based on several processor technologies known in the art. The processor 202 works in coordination with the transceiver 206, the input/output unit 208, and the multimodal content determination unit 210 for providing multimodal content to a first user. Examples of the processor 202 include, but are not limited to, processors such as an X86-based processor, a Reduced Instruction Set Computing (RISC) processor, an Application-Specific Integrated Circuit (ASIC) processor, and a Complex Instruction Set Computing (CISC) processor, for example.

The memory 204 comprises suitable logic, circuitry, interfaces, and/or code that may be configured to store the set of instructions, which are executed by the processor 202. Preferably, the memory 204 is configured to store one or more programs, routines, or scripts that are executed in coordination with the processor 202. Additionally, the memory 204 may be a Random-Access Memory (RAM), a Read-Only Memory (ROM), a Hard Disk Drive (HDD), a storage server, or a Secure Digital (SD) card.

The transceiver 206 comprises suitable logic, circuitry, interfaces, and/or code that may be configured to receive multimodal content to be provided to the first user via the communication network 106. The transceiver 206 is preferably configured to receive the recorded multimodal content for the plurality of users, and is preferably further configured to receive the demographic or psychographic information associated with users as well as preferences of the first user.

The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. Also, the transceiver 206 may communicate via wireless communication with networks, such as the Internet, an Intranet and/or a wireless network, such as a cellular telephone network, a wireless local area network (LAN) and/or a metropolitan area network (MAN). Accordingly, the wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The input/output unit 208 comprises suitable logic, circuitry, interfaces, and/or code that may be configured to provide one or more inputs for providing multimodal content to a first user. The input/output unit 208 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker. Further, the display screen is preferably configured to display multimedia content to a first user, including content created by a second user, and the speaker plays audio content.

The multimodal content determination unit 208 comprises suitable logic, circuitry, interfaces, and/or code that may be configured to determine digital multimodal content to be provided to the first user based on at least one of demographic information of the first user, and preferences of the first user associated with a real estate. The multimodal content determination unit 208 may be further configured to determine preferences of the first user associated with the real estate based on plurality of data sources using one or more machine learning techniques, and may be further configured to determine demographic information of the first user via data sources or machine learning.

In an exemplary operation, the second user who will be administering the application installed on the electronic device 102 for providing the multimodal content to the first user may upload a plurality of digital multimedia content, such as images and videos on the database server 104. Preferably, each of the plurality of multimedia content is associated with at least one tag (where each tag may be used to retrieve the multimedia content from the database server 104). For example, an image of a tiger may have an associated tag of 'apartment', 'duplex', 'single family' and the like.

Further, the second user may record multimodal content for the plurality of users and associate each content with at least one demographic or psychographic information or preference of each of the plurality of users (known, discovered, or anticipated). In an embodiment, the demographic information of each of the plurality of users is determined from a plurality of sources and is stored in a database server. For example, the second user may know the ethnicity and preferred language of a first user. Accordingly, the second user may record an audio or video in the preferred language of the first user and may modify the accent of the audio as per the intonation of the ethnicity of the first user. Preferably, each of the recorded multimodal content is associated with one or more tags so that tags of the multimedia content and tags of the multimodal content may be compared to provide the most relevant multimodal content for the first user.

The first user may utilize a software application installed on the electronic device 102 for viewing the multimodal content. The first user may provide a query to view multimedia content, such as images or video associated with a real estate or any other similar categories. For example, the first user may type the query "Show me real estates in Arlington Texas". In response to the search query, the processor 202 may retrieve the relevant multimedia content from the database server 104 and the display screen of the input/output unit 208 may display the multimedia content to the first user from a plurality of users. For example, the processor 202 may search and retrieve all multimedia content that have tags 'real estate', 'Nashville' and 'Tennessee' from the database server 104 and then display the retrieved multimedia content to the first user.

After displaying the multimedia content, the multimodal content determination unit 210 may be configured to receive demographic and/or psychographic information and preferences of the first user, such as real estate preferences, from the database server 104, via the transceiver 206. Additionally, the multimodal content determination unit 210 may be configured to determine the demographic/psychographic information and preferences of the first user using one or more machine learning techniques. For example, demographic information may include details about the age, race, ethnicity, gender, marital status, income, education, and employment of the first user. Psychographic information may include details such as safety, or status, for example. Examples of the preferences of the first user may include 'preference for renting', 'preference for independent villas', 'preference for garden', and the like.

Further, the multimodal content determination unit 210 may be configured to determine digital multimodal content to be provided to the first user based on demographic and/or psychographic information and preferences of the first user, such as real estate preferences. In continuation to the above example, an audio content or a video content associated with each of the multimedia content for display to the first user is identified. For example, the first user is shown an image of a real estate in Arlington, Tex. Along with the image, the first user is also shown a graphical user interface element. The multimodal content determination unit 210 may be configured to determine an audio content associated with the image that is being shown to the first user, and the audio content may provide further information about the real estate in Arlington, Tex. The audio content may further include information about the real estate (such as "available for rent" or has room for a garden. Likewise, a video content may be determined to show the interior and exterior parts of the real estate image to the first user.

After the multimodal content to be provided to the first user is determined, a hyperlink (internal or external) is associated to the graphical user interface element that is shown to the user along with the multimedia content to enable the first user to navigate and view the multimodal content. While the first user is viewing the multimedia content, an input from the first user may be received via the input/output unit 208 on the graphical user interface element. The input may correspond to performing one or more actions by the first user on the graphical user interface element, such as hovering, or clicking.

In response to the input from the user, input/output unit 208 is configured to trigger playback of the determined multimodal content. For example, the first user views the image of the real estate in Arlington Tex. and then clicks on the graphical user interface element. In response to the clicking, at least one digital multimodal content may be provided to the user. The first user can then listen to the audio content and/or view the video content. In an embodiment, the multimodal content determination unit 210 may be configured to modify the one or more characteristics associated with the audio content and the video content based on the demographic information or psychographic information of the first user, and/or preferences of the first user associated with the real estate. The one or more characteristics may include annotations, tone, subtitles, pitch, language, and the like. After the first user views the multimodal content, the first user may provides feedback on the multimodal content.

Below are a few examples of implementation of the invention.

Digital Multimedia Content Displayed to the User: Image
Digital Multimodal Content Provided to the User: Audio In an exemplary scenario, consider that a User A is interested in real estate A and hence the user searches on a mobile app for the real estate A. In response, the mobile app may display the image of the real estate A. Along with the image the user A may be displayed a playback icon. Once the user clicks on the playback icon then an audio content associated with the real estate A may be played to the User A. The audio content may be identified by the electronic device based on the demographic data of the User. For example, the audio content may include additional information associated with the real estate A and one or more characteristics of the audio content, and may be modified based on the language and demographic data of the User A.

Digital Multimedia Content Displayed to the User: Image
Digital Multimodal Content Provided to the User: Video In another embodiment, in response to User A clicking on the playback icon after viewing the image, the User A may be then displayed a video content associated with the real estate A. For example, the video content may include additional information associated with the real estate A and one or more characteristics of the video content, including annotations or subtitles and the like which may be modified based on the language and demographic data of the User A. For example, the video content may show the User A the interior and exterior environment of the real estate A.

Digital Multimedia Content Displayed to the User: Video
Digital Multimodal Content Provided to the User: Video In an exemplary scenario, consider that a User B is interested in real estate B and hence the user searches on a mobile app installed in the electronic device for the real estate B. In response, the mobile app may display a video file of the real estate B. Along with the video file the user B may be displayed a playback icon. Once the user clicks on the playback icon then another video content associated with the real estate B may be played to the User B. Other video content may be identified by the electronic device based on the demographic data of the User. For example, the other video content may include additional information associated with the real estate B and one or more characteristics of the other video content based on the language and demographic data of the User B.

Digital Multimedia Content Displayed to the User: Video
Digital Multimodal Content Provided to the User: Audio In another exemplary scenario, once the user B clicks on the playback icon then an audio content associated with the real estate B may be played to the User B. The audio content may be identified by the electronic device based on the demographic data of the User B. For example, the audio content may include additional information associated with the real estate B and one or more characteristics of the audio content modified based on the language and demographic data of the User B.

A person skilled in the art will understand that the scope of the disclosure is not limited to displaying only one audio content or only one video content to the user in response to the user clicking on the graphical user interface element. Further, a plurality of audio files and video files may be played for the user, including a combination of an audio file and a video file may be played for the user in response to the user clicking on the graphical user interface element.

A person skilled in the art will understand that the scope of the disclosure is not limited to providing multimodal content to a first user based on the aforementioned factors and using the aforementioned techniques, and that the examples provided do not limit the scope of the disclosure.

Figure 3A:
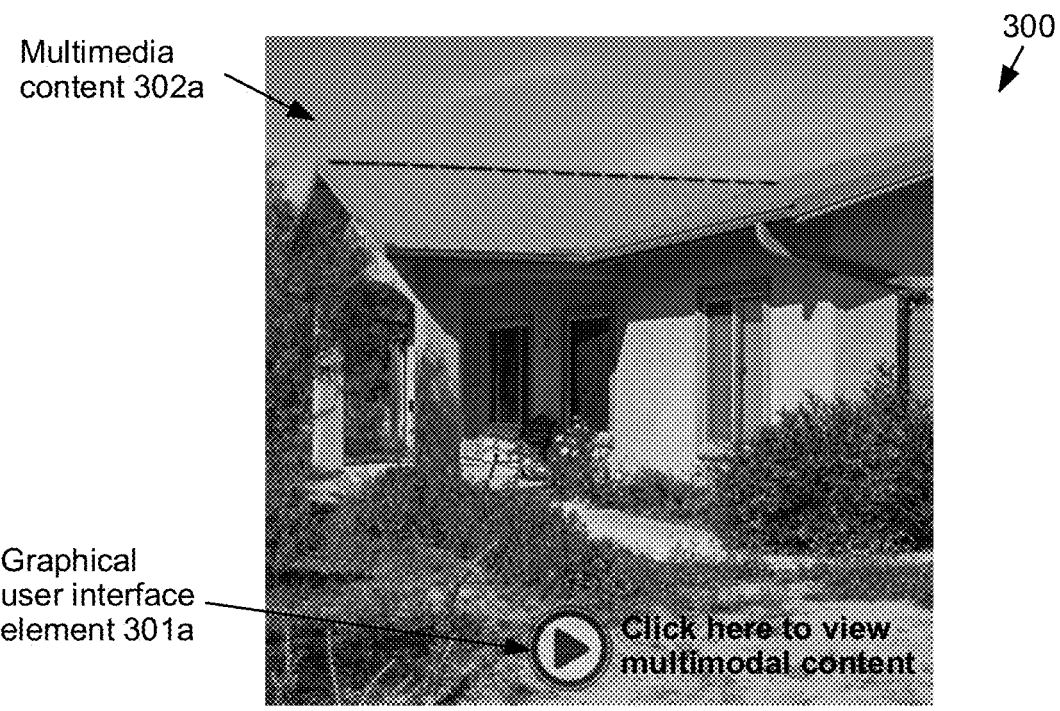
FIG. 3A illustrates a user interface configured to display digital content and the multimodal content to a first user, and FIG. 3B also illustrates a user interface configured to display digital content and the multimodal content to a first user.
Figure 3B:
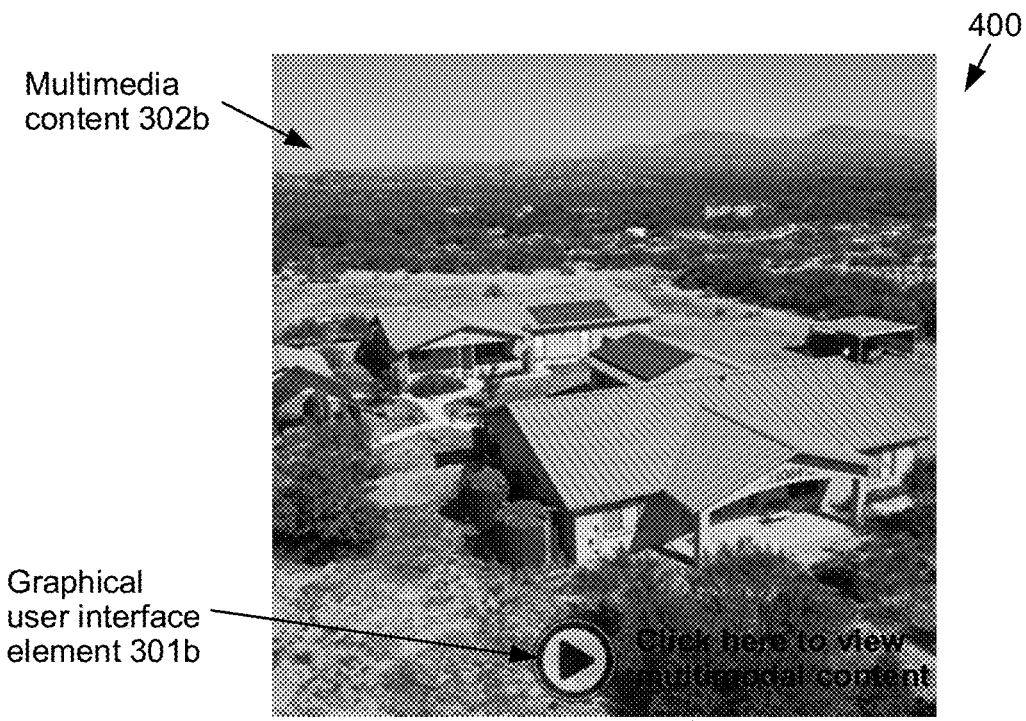

FIGS. 3A and 3B illustrate user interfaces 300 and 400 configured to display the multimedia content (302a, 302b) and the multimodal content to a first user. The multimedia content (302a, 302b) may be displayed to a user A. Along with the multimedia content, a graphical user interface (301a, 301b) is also displayed to the user A. After viewing the multimedia content (302a, 302b), the user A may click on the graphical user interface (301a, 301b). In response to such an action, the electronic device 102 may be configured to provide multimodal content comprising at least one of an audio content or a video content to the user A.

FIG. 4 illustrates a user interface 500 displayed to a second user for multimodal content recording. The second user may view a multimedia content 302c. Along with the multimedia content 302c, the second user may be shown three user interface elements, such as the record button 401, stop recording button 402, and save recording button 403. After viewing the multimedia content 302c, the second user may click on the record button 401 to initiate recording of the multimodal content associated with the multimedia content 302c. For example, the second user may click on the record button 401 and then record an audio content to be associated with the multimedia content 302c. Similarly, the second user may click on the record button 401 and then record a video content to be associated with the multimedia content 302c.

Once the recording is finished then the second user may click on the stop recording button 402 to stop the recording. Further, the second user may click save recording button 403 so that the recorded multimodal content (audio content and video content) gets associated with the multimedia content 302c.

Figure 5:
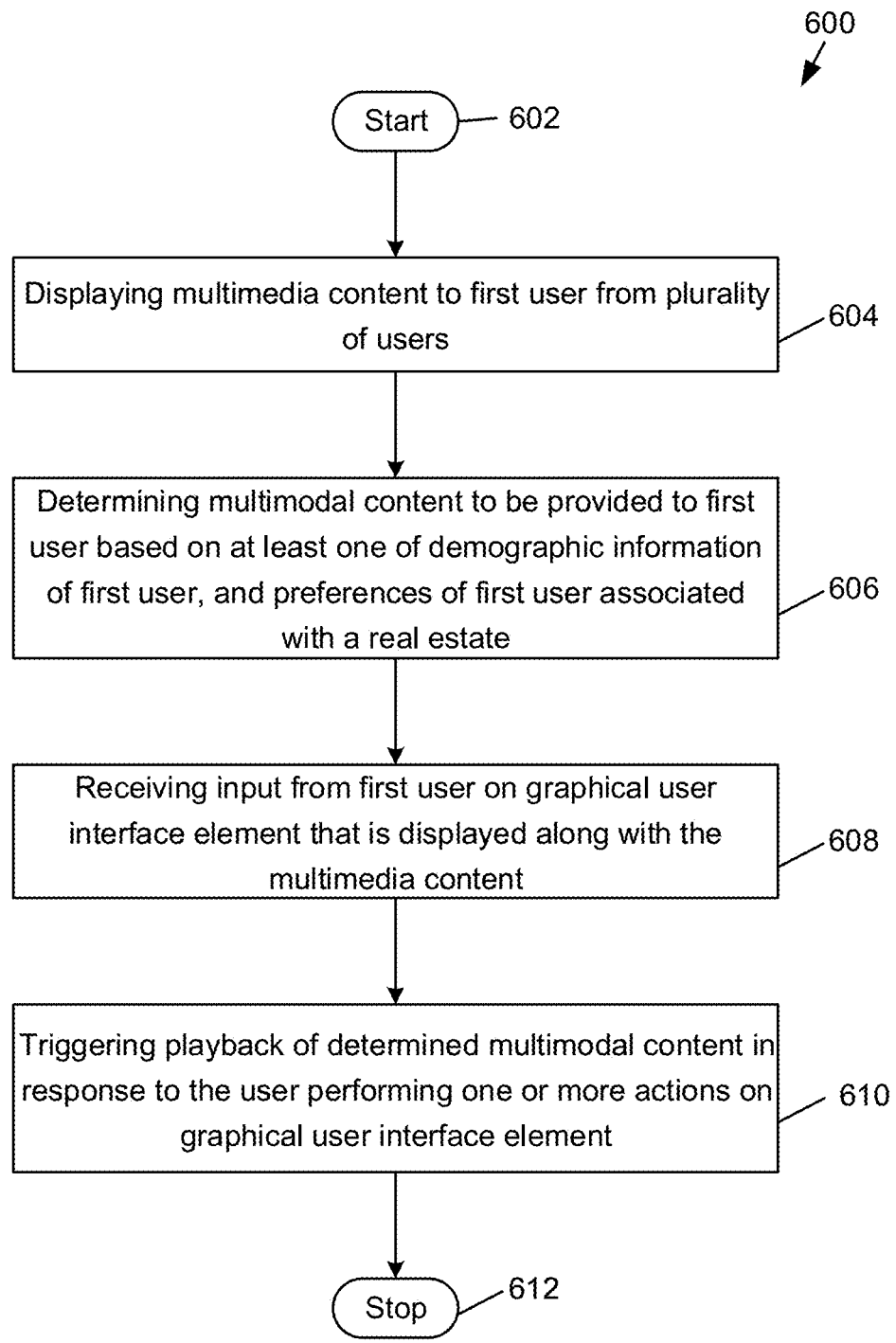
FIG. 5 is a flowchart that illustrates a method for providing multimodal content to a first user on an electronic device.

FIG. 5 is a flowchart that illustrates a method 600 for providing multimodal content to a first user on an electronic device 102. The method begins in a Start step 602 and proceeds to a Display step 604.

In the Display step 604, the electronic device 102 displays multimedia content to a first user from a plurality of users. Then, in a Determining step 606, the electronic device 102 determines multimodal content to be provided to the first user based on at least one of demographic information of the first user, and preferences of the first user associated with a real estate. At Receiving input step 608, the electronic device 102 receives an input from the first user on a graphical user interface element that is displayed along with the multimedia content. In an embodiment, the input corresponds to performing one or more actions by the first user on the graphical user interface element. Further, at a Triggering playback step 610, the electronic device 102 triggers playback of the determined multimodal content in response to the user performing one or more actions on the graphical user interface element, and Control passes at the Stop step 612.

FIG. 6 illustrates a block diagram of an exemplary computer system 601 for implementing embodiments consistent with the present disclosure.

Variations of a computer system 601 may be used for performing optical character recognition on an image including a plurality of printed characters. The computer system 601 may comprise a central processing unit ("CPU" or "processor") 602. The processor 602 may comprise at least one data processor for executing program components for executing user- or system-generated requests. A user may include a person, a person using a device such as such as those included in this disclosure, or a device itself. Additionally, the processor 602 may include specialized processing units such as integrated system (bus) controllers, memory management control units, floating point units, graphics processing units, digital signal processing units, or the like. In various implementations the processor 602 may include a microprocessor, such as AMD Athlon, Duron or Opteron, ARM's application, embedded or secure processors, IBM PowerPC, Intel's Core, Itanium, Xeon, Celeron or other line of processors, for example. Accordingly, the processor 602 may be implemented using mainframe, distributed processor, multi-core, parallel, grid, or other architectures. Some embodiments may utilize embedded technologies like application-specific integrated circuits (ASICs), digital signal processors (DSPs), or Field Programmable Gate Arrays (FPGAs), for example.

Processor 602 is disposed in communication with one or more input/output (I/O) devices via I/O interface 603. Accordingly, the I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like, for example.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, or visors, for example. Likewise, an output device 605 may be a printer, fax machine, video display (e.g., cathode ray tube (CRT), liquid crystal display (LCD), light-emitting diode (LED), plasma, or the like), or audio speaker, for example. In some embodiments, a transceiver 606 may be disposed in connection with the processor 602. The transceiver 606 may facilitate various types of wireless transmission or reception. For example, the transceiver 606 may include an antenna operatively connected to a transceiver chip (example devices include the Texas Instruments® WiLink WL1283, Broadcom® BCM4750IUB8, Infineon Technologies® X-Gold 618-PMB9800, or the like), providing IEEE 802.11a/b/g/n, Bluetooth, FM, global positioning system (GPS), and/or 2G/3G/5G HSDPA/HSUPA communications, for example.

In some embodiments, the processor 602 may be disposed in communication with a communication network 608 via a network interface 607. The network interface 607 is adapted to communicate with the communication network 608. The network interface 607 may employ connection protocols including, without limitation, direct connect, Ethernet (e.g., twisted pair 10/100/1000 Base T), transmission control protocol/internet protocol (TCP/IP), token ring, or IEEE 802.11a/b/g/n/x, for example. The communication network 608 may include, without limitation, a direct interconnection, local area network (LAN), wide area network (WAN), wireless network (e.g., using Wireless Application Protocol), or the Internet, for example. Using the network interface 607 and the communication network 608, the computer system 601 may communicate with devices such as shown a mobile/cellular phone 610, a Point of Sale Terminal 611, or a laptop 609. Other exemplary devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface 612 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, or solid-state drives, for example.

The memory devices may store a collection of program or database components, including, without limitation, an operating system 616, user interface application 617, web browser 618, mail server 619, mail client 620, user/application data 621 (e.g., any data variables or data records discussed in this disclosure) for example. The operating system 616 may facilitate resource management and operation of the computer system 601. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

A user interface 617 if for facilitating the display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, or widgets, for example. Graphical user interfaces (GUIs) may be employed, including, without limitation, Apple Macintosh operating systems' Aqua, IBM OS/2, Microsoft Windows (e.g., Aero, Metro, etc.), Unix X-Windows, or web interface libraries (e.g., ActiveX, Java, Javascript, AJAX, HTML, Adobe Flash, etc.), for example.

In some embodiments, the computer system 601 may implement a web browser 618 stored program component. The web browser 618 may be a hypertext viewing application, such as Microsoft Internet Explorer, Google Chrome, Mozilla Firefox, Apple Safari, or Microsoft Edge, for example. Secure web browsing may be provided using HTTPS (secure hypertext transport protocol), secure sockets layer (SSL), Transport Layer Security (TLS), or the like. Web browsers may utilize facilities such as AJAX, DHTML, Adobe Flash, JavaScript, Java, or application programming interfaces (APIs), for example. In some embodiments the computer system 601 may implement a mail server 619 stored program component. The mail server 619 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, or WebObjects, for example. The mail server 619 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client 620 may be a mail viewing application, such as Apple Mail, Microsoft Entourage, Microsoft Outlook, or Mozilla Thunderbird.

In some embodiments, the computer system 601 may store user/application data 621, such as the data, variables, records, or the like as described in this disclosure. Such databases may be implemented as fault-tolerant, relational, scalable, secure databases such as Oracle or Sybase, for example. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Various embodiments of the disclosure encompass numerous advantages including methods and systems for providing multimodal content to a first user. In an embodiment, the methods and systems may enable a user to associate a video file with an image file which can be viewed by the user when the user clicks on the image. Further, the disclosed methods and systems provide a means for a user to view additional multimodal content (audio or video) that is associated with a multimedia content, such as an image or a video file. Further, the multimodal content that is to be viewed by the user is determined based on the preferences of the user and/or the demographic information of the user and hence a more personalized experience is provided to the user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for providing digital audio content to a first user of a real estate software application, the method comprising:

recording and storing, by an electronic device, the digital audio content;

associating, by the electronic device, the digital audio content with at least one of demographic information of the first user, psychographic information of the first user, and the real estate preference of the first user, wherein the digital audio content is created by a second user, wherein the first user is different from the second user, wherein the first user is a user who is interested to view the digital audio content of a real estate;
providing, by the electronic device, the digital audio content to the first user;
determining, by the electronic device, the digital audio content to be provided to the first user based on at least one of:
the demographic information of the first user,
the psychographic information of the first user, and
the real estate preference of the first user;
receiving, by the electronic device, an input from the first user on a graphical user interface element that is displayed in conjunction with the digital audio content, wherein the input corresponds to performing one or more actions by the first user on the graphical user interface element; and
triggering, by the electronic device, playback of the determined digital audio content to provide an additional information associated with the real estate in response to the user performing one or more actions on the graphical user interface element.

2. The method of claim 1 wherein the digital audio content is recorded in a preferred language of the first user and an accent of the digital audio content is modified as per an intonation of an ethnicity of the first user.

3. The method of claim 1 wherein the first user provides feedback on the digital audio content viewed by the first user, wherein the digital audio content is associated with at least one tag, wherein the at least one tag provides a most relevant digital audio content to the first user.

4. The method of claim 1 wherein the digital audio content further comprises at least one digital graphic content, wherein a hyperlink is associated to the graphical user interface element that is shown to the first user along with the digital audio content to enable the first user to navigate and view the additional information associated with the real estate on the graphical user interface element.

5. The method of claim 1 wherein the digital audio content is related to a real estate property.

6. An electronic device that provides digital audio content to a first user of a real estate software application, the electronic device comprising:
a hardware processor; and
a memory communicatively coupled to the hardware processor, wherein the memory stores processor instructions, which, on execution, causes the hardware processor to:
record and store the digital audio content;
associate the digital audio content with at least one of demographic information of the first user, psychographic information of the first user, and the real estate preference of the first user, wherein the digital audio content is created by a second user, wherein the first user is different from the second user, wherein the first user is a user who is interested to view the digital audio content of a real estate;
provide the digital audio content to the first user;
determine the digital audio content to be provided to the first user based on at least one of:
the demographic information of the first user,
the psychographic information of the first user, and
the real estate preference of the first user;
receive an input from the first user on a graphical user interface element that is displayed in conjunction with the digital audio content, wherein the input corresponds to performing one or more actions by the first user on the graphical user interface element; and
trigger playback of the determined digital audio content to provide an additional information associated with the real estate in response to the user performing one or more actions on the graphical user interface element.

7. The electronic device of claim 6, wherein the digital audio content is recorded in a preferred language of the first user and an accent of the digital audio content is modified as per an intonation of an ethnicity of the first user.

8. The electronic device of claim 6 wherein the first user provides feedback on the digital audio content that is viewed by the first user, wherein the digital audio content is associated with at least one tag, wherein the at least one tag provides a most relevant digital audio content to the first user.

9. The electronic device of claim 6 wherein the digital audio content further comprises at least one digital graphic content, wherein a hyperlink is associated to the graphical user interface element that is shown to the first user along with the digital audio content to enable the first user to navigate and view the additional information associated with the real estate on the graphical user interface element.

10. The electronic device of claim 6 wherein the digital audio content is related to a real estate property.

11. A non-transitory computer readable medium including instruction stored thereon that when processed by at least one hardware processor cause an electronic device to perform an operation comprising:
recording and storing, by an electronic device, the digital audio content;
associating, by the electronic device, the digital audio content with at least one of demographic information of the first user, psychographic information of the first user, and the real estate preference of the first user, wherein the digital audio content is created by a second user, wherein the first user is different from the second user, wherein the first user is a user who is interested to view the digital audio content of a real estate;
providing, by the electronic device, the digital audio content related to a real estate property displayed to the first user;
determining, by the electronic device, the digital audio content to be provided to the first user based on at least one of:
the demographic information of the first user,
the psychographic information of the first user, and
the real estate preference of the first user;
receiving, by the electronic device, an input from the first user on a graphical user interface element that is displayed in conjunction with the digital audio content, wherein the input corresponds to performing one or more actions by the first user on the graphical user interface element; and
triggering, by the electronic device, playback of the determined digital audio content to provide an additional information associated with the real estate in response to the user performing one or more actions on the graphical user interface element.

* * * * *